United States Patent
Hiemer

(10) Patent No.: US 8,655,552 B2
(45) Date of Patent: Feb. 18, 2014

(54) METHOD AND CONTROL DEVICE FOR TRIGGERING PASSENGER PROTECTION MEANS FOR A VEHICLE

(75) Inventor: Marcus Hiemer, Kehlen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/995,326

(22) PCT Filed: Apr. 20, 2009

(86) PCT No.: PCT/EP2009/054640
§ 371 (c)(1),
(2), (4) Date: Nov. 30, 2010

(87) PCT Pub. No.: WO2009/149975
PCT Pub. Date: Dec. 17, 2009

(65) Prior Publication Data
US 2011/0112726 A1    May 12, 2011

(30) Foreign Application Priority Data
Jun. 13, 2008  (DE) .......................... 10 2008 002 429

(51) Int. Cl.
*B60R 22/00*  (2006.01)

(52) U.S. Cl.
USPC ........................................... 701/46; 340/436

(58) Field of Classification Search
USPC ...................................... 701/46, 45; 340/436
See application file for complete search history.

(56) References Cited

U.S. PATENT DOCUMENTS

| 5,587,906 | A  | * | 12/1996 | McIver et al. ................. 701/36 |
| 5,900,807 | A  | * | 5/1999 | Moriyama et al. ............ 340/436 |
| 6,032,092 | A  | * | 2/2000 | Laaser ............................ 701/45 |
| 6,256,563 | B1 | * | 7/2001 | Blank et al. .................... 701/45 |
| 6,426,567 | B2 | * | 7/2002 | Ugusa et al. ................. 307/10.1 |
| 6,459,366 | B1 | * | 10/2002 | Foo et al. ....................... 340/436 |
| 7,197,396 | B2 | * | 3/2007 | Stopczynski ................. 701/301 |
| 7,292,921 | B2 | * | 11/2007 | Schuller et al. ................ 701/45 |
| 7,840,325 | B2 | * | 11/2010 | Foo et al. ........................ 701/45 |

FOREIGN PATENT DOCUMENTS

| DE | 102 52 227 | 5/2004 |
| WO | 2004/043745 | 5/2004 |

* cited by examiner

*Primary Examiner* — Thomas Black
*Assistant Examiner* — Shardul Patel
(74) *Attorney, Agent, or Firm* — Kenyon & Kenyon LLP

(57) ABSTRACT

A control device and a method for triggering a passenger protection arrangement for a vehicle are provided, at least two acceleration signals being provided by at least two acceleration sensors oriented in different spatial directions. The orientations are angled in relation to a coordinate system oriented toward the vehicle longitudinal direction. The at least two acceleration signals are transformed on at least two axes of the coordinate system. The triggering signal is generated as a function of the comparison of the at least two acceleration signals and the transformed acceleration signals. The passenger protection arrangement is triggered as a function of the triggering signal.

12 Claims, 4 Drawing Sheets

METHOD AND CONTROL DEVICE FOR TRIGGERING PASSENGER PROTECTION MEANS FOR A VEHICLE

FIELD OF THE INVENTION

The present invention relates to a control device and a related method thereof for a passenger protection arrangement for a vehicle.

BACKGROUND INFORMATION

German patent document DE 102 52 227 A1 refers to a sensor system for detecting an accident signal can be oriented in different spatial directions.

SUMMARY OF THE INVENTION

In contrast, the control device and the method according to the present invention for triggering a passenger protection arrangement for a vehicle having the features of the independent claims have the advantage that in the case of a coordinate system oriented in relation to the vehicle longitudinal direction having acceleration sensors disposed at an angle with regard to their sensitivity axes, both the acceleration signals oriented in this angle and the transformed acceleration signals on the coordinate system are used immediately. It is thus possible to better detect angled impact situations, so-called angle crashes. More information about an impact is used. The improved angle crash detection has the advantage that in the event of crashes against a hard barrier at speeds between 25 and 30 km/h the passenger protection arrangement is precisely triggered, since angle crashes are better detected in accordance with the exemplary embodiments and/or exemplary methods of the present invention, and thus in the event of so-called low-risk crashes such triggerings must be prevented in advance. That is, in the event of such angle crashes, a triggering is not permitted to occur. Furthermore, the exemplary embodiments and/or exemplary methods of the present invention has the advantage that it allows for so-called non-triggering crashes and triggering angle crashes to be differentiated in an improved manner.

An additional great advantage is that essential information may be obtained for the crashes occurring in the field. For example, soft crashes from the side may be detected only with difficulty. These collisions result in a yaw acceleration that may be detected in the control device and used for the triggering decision. The invention provided supplies valuable supplementary information for such a yaw acceleration algorithm, for example, for plausibilization.

In the case at hand, a control device is an electrical device that processes sensor signals and generates triggering signals for the passenger protection arrangement such as airbags, belt tighteners, crash-active headrests, etc., as a function thereof. Triggering means the activation of such a passenger protection arrangement.

An interface is predominantly developed as hardware and/or software. In a hardware design, a development of the interfaces on a system ASIC is possible, in particular. That is, the interface is part of an integrated circuit having a plurality of sections that fulfill different functions for the control device. However, alternatively it is possible that the interface has its own integrated circuit or is part of a processor or, in the software development, is a software module on such a processor.

The acceleration signals may have all possible forms, in particular, a preprocessing such as a smoothing, filtering, integration, etc., may be performed. The acceleration sensors may be disposed in all possible locations on the vehicle. This includes a central placement, for example, in a sensor control device, but also a decentralized placement in the region of the vehicle sides, for example. The acceleration sensors are normally produced micromechanically, it being possible to use a surface micromechanical technique for the production, in particular. In this context, a change in capacitance is converted into a voltage change. The angled placement is, for example, characterized in that in the horizontal plane of the vehicle, it is offset from the vehicle longitudinal axis by 45° in each instance. However, every other angled placement is also possible, in particular, also a 45° placement, in relation to the vehicle transverse axis, of the two acceleration sensors respectively.

The evaluation circuit is designed as hardware and/or software, it also being possible for an integration to be provided as a processor having corresponding software or as an implementation of the functions of the evaluation circuit in hardware as a so-called ASIC. All possible processor types are provided as processors, in particular dual core processors and also in particular microcontrollers. The transformer module and the comparison module may also be designed as hardware and/or software; in particular, a development in software modules may be provided. The transformer module implements the function of transforming the acceleration signals from the angled placement into acceleration signals that are respectively oriented toward axes of the coordinate system. This may occur through a corresponding vector analysis of the components, in the vehicle longitudinal direction and the vehicle transverse direction, for example. The comparison module has the task of comparing the acceleration signals and the transformed accelerations signals. This comparison may take place with the aid of the preprocessed acceleration signals but also with the aid of further processed acceleration signals, for example with the aid of integrations, derivations, etc.

The triggering circuit may be implemented in hardware and/or software as well. In particular, in a hardware design, this triggering circuit may also be part of the system ASIC. In this context, the triggering circuit contains the corresponding logic in order to process the triggering signals, and the power switches in order to direct the corresponding triggering energy to the passenger protection arrangement. This triggering energy is stored, for example, in an energy reserve, for example, in a capacitor, and is then conducted through to an ignition element of an airbag, for example, by electrically controllable power switches. The triggering signal may be made up of one signal or a plurality of signals that are also transmitted in parallel. In this context, a higher redundancy and thus security is achieved.

The measures and further refinements described in the dependent claims permit advantageous improvements to the control device and method, respectively, set forth in the independent patent claims for triggering a passenger protection arrangement for a vehicle.

In this context, it is advantageous that the comparison module for determining a crash type is provided as a function of a comparison and generates the triggering signal as a function of the crash type. The comparison module is able to identify the angle crash, in particular. As described above, this allows for an improved processing of the accident signals and helps to better differentiate crash types.

Furthermore, it is advantageous that the comparison module supplies the crash type to a main algorithm, the main algorithm influencing at least one threshold as a function of the crash type. Thus, the crash type ascertained by the comparison module is used to influence the triggering decision made by the main algorithm. If the threshold is lowered, the main algorithm becomes more sensitive and thus triggers the passenger protection arrangement earlier than is provided in the basic setting. A classification in a corresponding classification algorithm may also be accordingly influenced.

In this context, it is furthermore advantageous that the comparison module is connected to a yaw acceleration algorithm in such a manner that a result of the yaw acceleration algorithm is plausibilized with the aid of the crash type. As described above, a yaw acceleration may be evaluated and this result may then be plausibilized using the control device and method according to the present invention.

It is furthermore advantageous that the comparison module is connected to a second interface and the crash type is made available to an additional control device via the second interface. In this context, the second interface may be a bus transceiver such as a CAN transceiver, for example, but also a point-to-point connection. The interface may be designed as hardware and/or software, in particular. Thus the crash type may also be provided to other control devices, such as a control device for influencing the driving dynamics, in order to achieve a better stabilization of the vehicle in the event of a multiple crash, for example.

It is furthermore advantageous that the comparison module has a first threshold value decider that compares one of the transformed acceleration signals to a predetermined threshold value. It is advantageous that the comparison module has a second threshold value decider that compares a signal derived from the one of the transformed acceleration signals to one of the at least two acceleration signals, that a logic element links together output signals of the two threshold value deciders, and that the comparison module sets at least one flag as a function of the link, the comparison module generating the triggering signal as a function of the at least one flag. In this context, the threshold value deciders, the logic element, are designed as hardware and/or software. The first threshold value decider checks whether the transformed, signal exceeds a predetermined variable at all, and performs the further processing only when this is the case. Otherwise, the impact is too small to implement an additional classification. The second threshold value decider then ultimately compares the transformed acceleration signal and the original acceleration signal, respectively. The logic element, for example, a logical AND gate, links the output signals of the two threshold value deciders in order to set a flag as a function thereof. The flag indicates, for example, which angle crash is identified and the triggering signal may then be generated as a function of this flag. In the case at hand, generate also means influencing how the triggering signal is generated.

It is furthermore advantageous that the flag indicates an angle crash, to wit a predetermined angle crash.

Exemplary embodiments of the present invention are illustrated in the drawing and are explained in greater detail in the following description.

DETAILED DESCRIPTION

Figure 7:
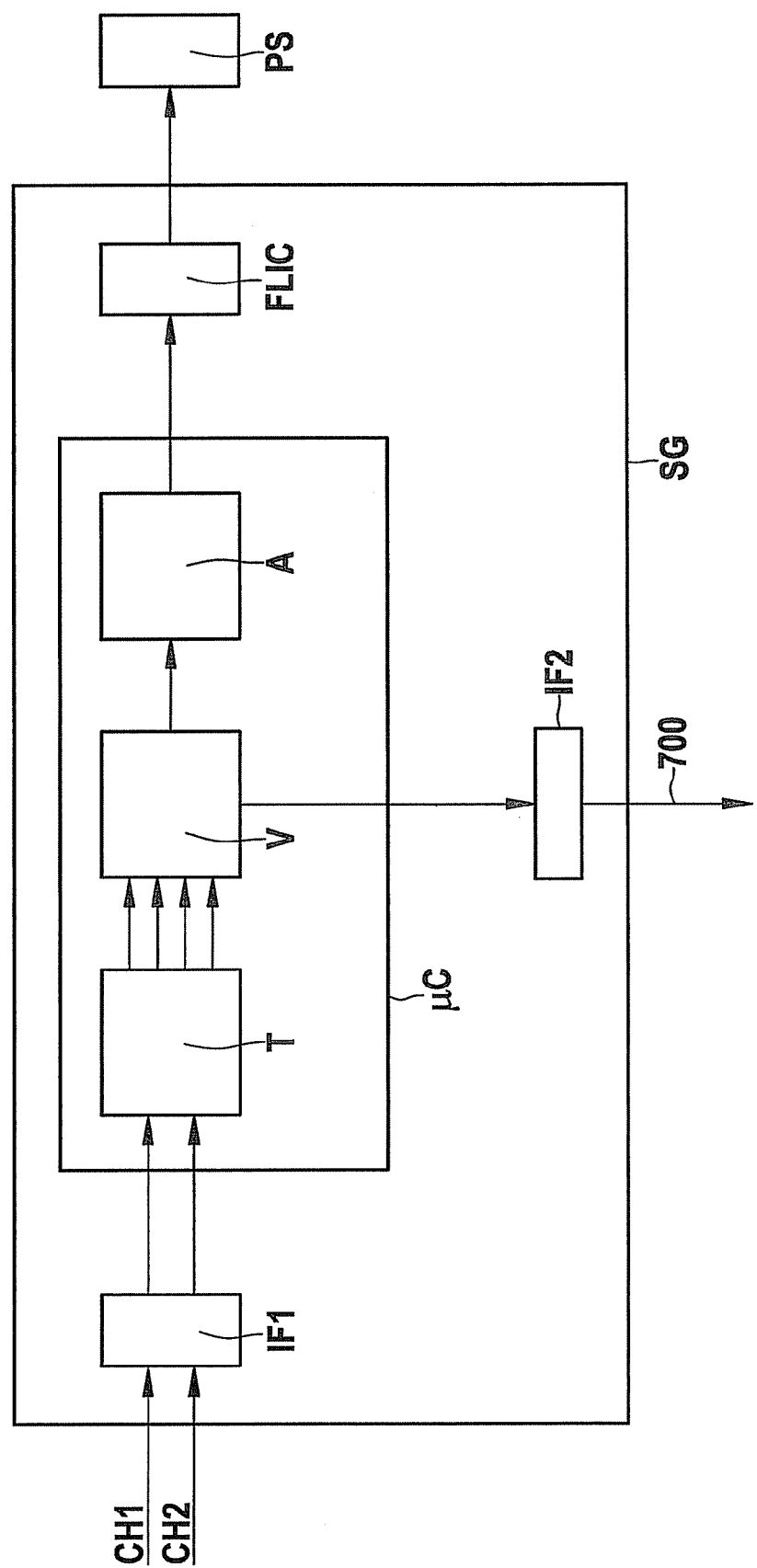
FIG. 7 shows a block diagram of the control device according to the present invention.

FIG. 7 shows in a block diagram control device SG according to the present invention. The signals CH1 and CH2, which are the respectively measured acceleration signals in the angled placement, are transmitted by the acceleration sensor system to interface IF1. In the case at hand, the acceleration sensor system is disposed outside of control device SG. Interface IF1, which, as specified above, may be part of a system ASIC, for example, transmits signals CH1 and CH2, via the SPI bus, for example, to microcontroller µC for further processing. As a software module, microcontroller µC has transformer module T, which generates from signals CH1 and CH2 the signals in the coordinate system of the vehicle, namely in relation to the vehicle longitudinal direction and the vehicle transverse direction. Transformer module T then transmits these transformed acceleration signals and the measured acceleration signals, also preprocessed, to comparison module V. Comparison module V compares signals CH1 and CH2 to the transformed signals, respectively, in order to recognize whether it is an angle crash or not. In this context, an angle crash is determined if one of signals CH1 and CH2 is greater than the respectively transformed signal. This angle crash information is then supplied for one to a main algorithm A, which generates the triggering signal as a function thereof. Furthermore, this angle crash information, for example, via a flag, is also set via an additional interface IF2 to a bus 700, so that other control devices such as the driving dynamics control device may also receive this information and in a multiple crash may also in this way have a stabilizing effect on the vehicle.

The triggering signal is then transmitted by microcontroller µC via module A to triggering circuit FLIC, which triggers electrically controllable power switches as a function of the triggering signal, in order to supply the corresponding triggering energy to a corresponding passenger protection arrangement PS. Corresponding passenger, protection arrangement PS is thus triggered.

Figure 1:
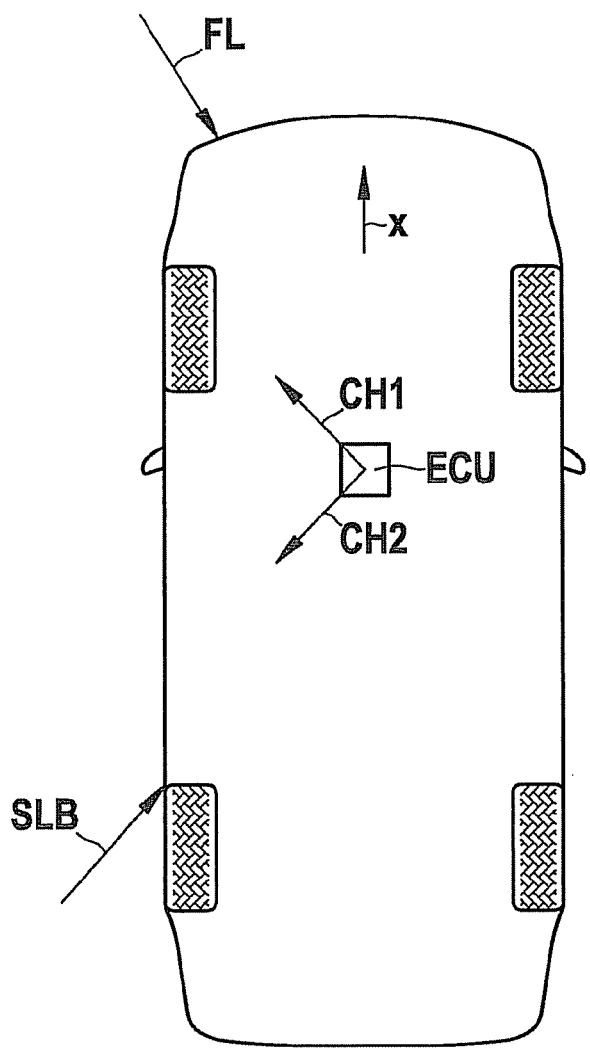
FIG. 1 shows a first placement of the acceleration sensors in the control device in the vehicle.

FIG. 1 illustrates in a basic representation a placement of the acceleration sensors in control device ECU, in the case at hand the acceleration sensors being labeled with signal names. CH1 and CH2. In the case at hand, the acceleration sensors are oriented at a 45° angle to the vehicle transverse direction. It is thus possible to detect angle crashes FL and SLB, for example. Angle crash FL stands for front left, and angle crash SLB for side left back. The vehicle longitudinal direction is labeled by x. In the case at hand, the vehicle is considered from below.

Figure 2:
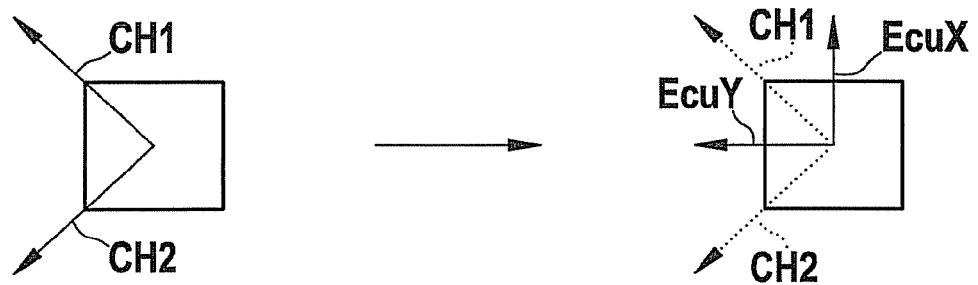
FIG. 2 shows the signals that are measured and are to be processed.

FIG. 2 illustrates in principle first the measured variables CH1 and CH2, which are oriented at an angle to the vehicle transverse direction, like in FIG. 1, and the signals to be processed therefrom, to wit, the measuring signals themselves, CH1 and CH2, as well as the transformed acceleration signals Ecux and Ecuy. This is valid in the case, as shown in FIG. 7, that the acceleration sensor system is disposed outside of the control device or, as shown in FIG. 1, that it is disposed inside of control device ECU.

Figure 3:
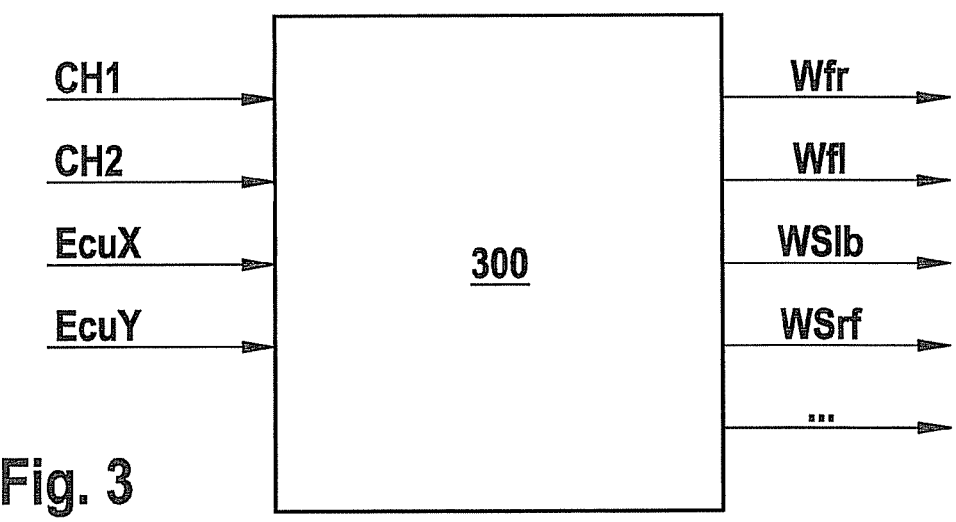
FIG. 3 shows a block diagram to elucidate the function according to the present invention.

FIG. 3 shows in principle the incoming signals, to wit, the signals CH1, CH2, Ecux, and Ecuy, that enter into the function for the detection of angle crashes 300. For example, the signals Wfr, Wfl, WSlb, WSrf can be generated therefrom. In this context, Wfr means an angle crash front right, Wfl an angle crash front left, WSlb an angle crash side left back, and WSrf an angle crash side right front. Additional angle crashes may be identified accordingly. Function 300 is normally implemented on microcontroller μC.

Figure 4:
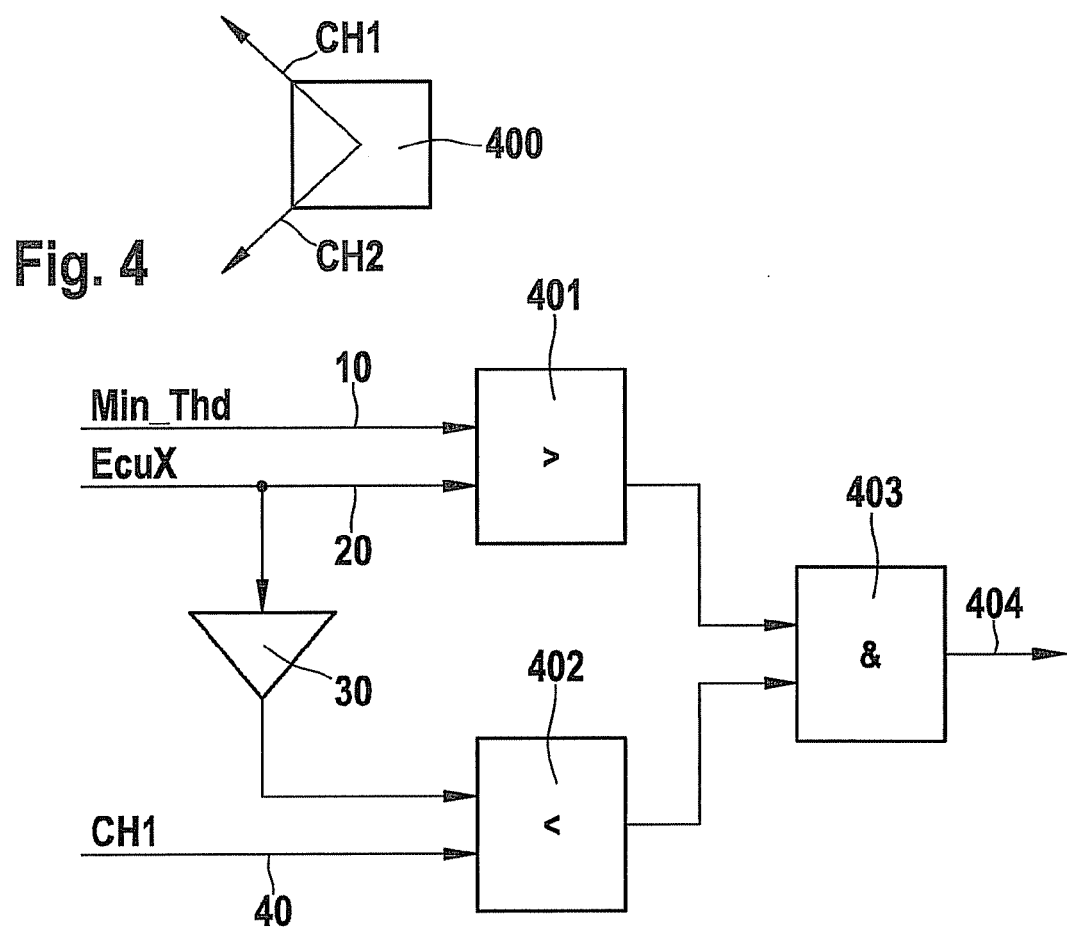
FIG. 4 shows another block diagram to elucidate the sequence of the method according to the present invention.

FIG. 4 shows a block diagram for illustrating what may occur in comparison module V for a placement according to FIG. 1. Placement 400 illustrates an angled sensor system relative to the vehicle longitudinal axis. Signal 20 transformed to the vehicle longitudinal direction is compared to a predefined threshold value Min_Thd 10 in threshold value decider 401. In this context, the threshold value is selected such that signal 20 has to reach a specific level in order to enable the further processing at all. In block 30, signal 20 is used to set an application parameter that causes a flag for an angle crash front left to be set if an angle crash is detected in the case at hand. Signal EcuX, scaled by a factor 30, is then compared to signal 40, that is, signal CH1, in threshold value decider 402. Only if signal 20, scaled by a factor 30, is smaller than signal 40, and signal 20 has exceeded threshold value Min_Thd 10, will logic element 403, in the case at hand a logical AND operation, set flag 404 for the angle crash front left.

Figure 5:
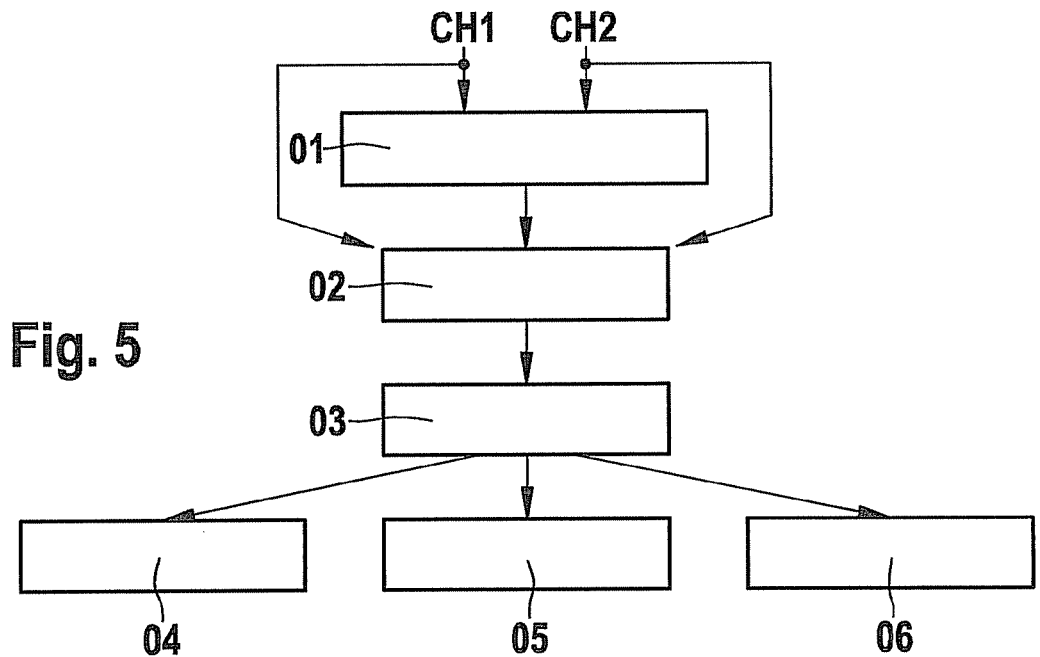
FIG. 5 shows a flow chart illustrating the method according to the present invention.

FIG. 5 shows a flow chart of the method according to the present invention. The measured acceleration sensor values CH1 and CH2 enter into method step 01, in that these measuring values are transformed on the coordinate system in the vehicle, as described above. The transformed signals and also measuring signals CH1 and CH2 enter in method step 02. In method step 02, characteristics are generated that may be generated through a temporal integration, a window integration, a high-pass filtering or in another way, for example.

Figure 6:
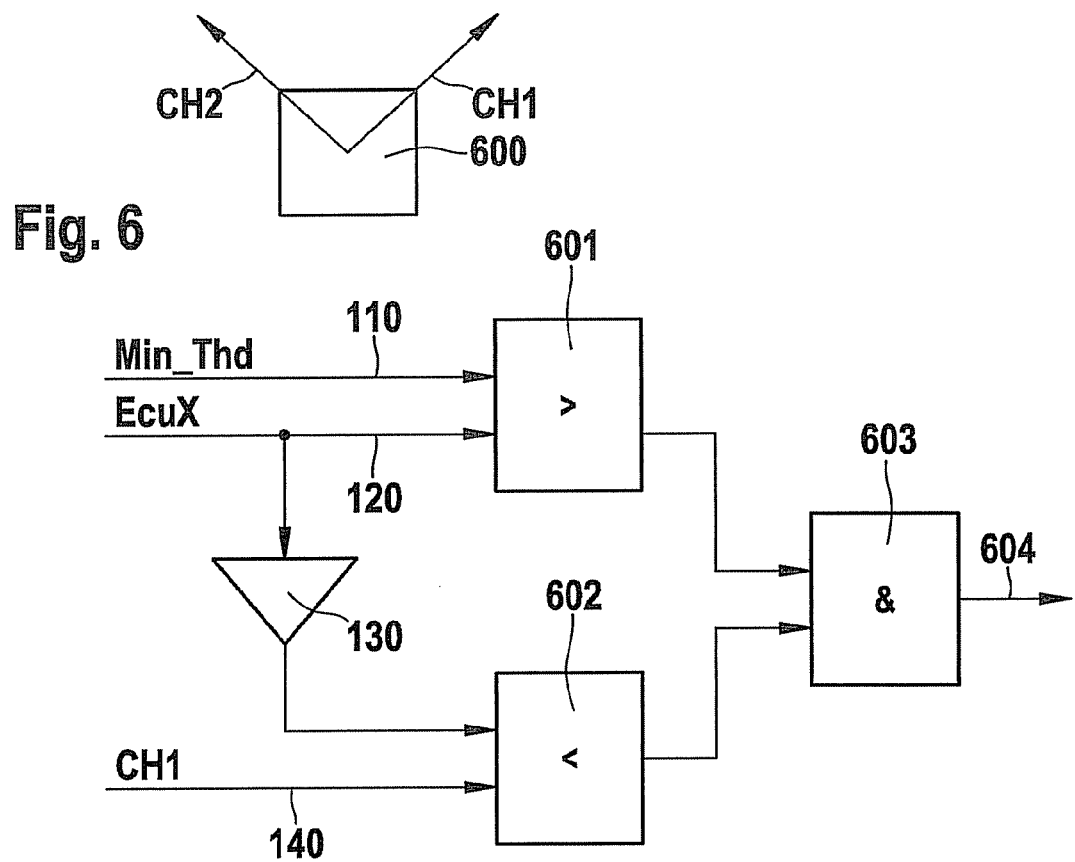
FIG. 6 shows an additional block diagram to elucidate the method according to the present invention.

In method step 03, a threshold value comparison occurs, as may be seen in FIG. 4 or also in FIG. 6, for example. The corresponding angle crashes may then, be detected on this basis. The information about the crash type may be used in subsequent algorithm parts, for example in an influencing module for the main algorithm threshold (method step 04) or in the plausibilization of a yaw acceleration algorithm (method step 05) or in the transmission of this crash type information to an additional control device (method step 06).

FIG. 6 illustrates an additional block diagram, now for another placement of the acceleration sensors, to wit, in an angled placement in relation to the vehicle longitudinal axis. This is represented by block 600. In the case at hand, the structure of the signal processing is identical to that in FIG. 4. In turn, the amount of the signal lathe vehicle longitudinal direction, that is, the transformed acceleration signal 120 is compared to a predetermined threshold value 110 in threshold value decider 601. Only if signal 120 is above threshold value 110 is a logical 1 output. In block 130, it is set that the flag for the angle crash side left back is set if the angle trash was detected in the case at hand. Signal 120 scaled by a factor 130 is then compared in threshold value decider 602 with signal CH1 140 as well. Only if signal 120 scaled by factor 130 is under signal 140 is a logical 1 output by threshold value decider 602. Logical AND gate 603 as the logic element outputs a logical 1 604 only if both threshold value decider 601 and 602 have both output such a logical 1 as well. Only then is the flag set for the angle crash side left back.

What is claimed is:

1. A control device for triggering a passenger protection arrangement for a vehicle, comprising:
a first interface providing at least two acceleration signals in at least two acceleration sensors oriented in different spatial directions, wherein each of the at least two acceleration sensors is oriented at a non-zero angle relative to both a horizontal axis and a vertical axis of a two-dimensional coordinate system in which the vertical axis lies along a vehicle longitudinal direction and the horizontal axis lies along a vehicle transverse direction;
an evaluation circuit having a transformer module that transforms the at least two acceleration signals to corresponding acceleration signals along the horizontal and vertical axes of the coordinate system, and a comparison module that generates a triggering signal as a function of a comparison of the at least two acceleration signals and the corresponding transformed acceleration signals; and
a triggering circuit that triggers the passenger protection arrangement as a function of the triggering signal;
wherein the comparison module imposes a first condition in which the triggering signal is only generated in response to a determination that a scaled version of any of the transformed acceleration signals is smaller than one of the at least two acceleration signals from which the transformed acceleration signal was derived.

2. The control device of claim 1, wherein the comparison module determines a crash type as a function of the comparison, and wherein the triggering signal is generated as a function of the crash type.

3. The control device of claim 1, wherein the comparison module supplies the crash type to a main algorithm, and wherein the main algorithm influences at least one threshold of a crash detection algorithm having one of the transformed acceleration signals as an input as a function of the crash type.

4. The control device of claim 2, wherein the comparison module is linked to a yaw acceleration algorithm so that a result of the yaw acceleration algorithm is plausibilized with the aid of the crash type.

5. The control device of claim 2, wherein the comparison module is connected to a second interface so that the crash type is made available to an additional control device via the second interface.

6. The control device of claim 1, wherein the comparison module has a first threshold value decider that compares one of the transformed acceleration signals to a predefined threshold value, wherein the comparison module has a second threshold value decider that compares a signal derived from the one of the transformed acceleration signals to one of the at least two acceleration signals, wherein a logic element links together the output signals of the two threshold value deciders, wherein the comparison module sets at least one flag as a function of the link, and wherein the comparison module generates the triggering signal as a function of the at least one flag.

7. The control device of claim 6, wherein the at least one slope indicates an angle crash.

8. The control device of claim 1, wherein the comparison module imposes a second condition in which the triggering signal is only generated if any of the transformed acceleration signals, the scaled version of which meets the first condition, is larger than a predefined threshold value corresponding to a minimum required value for triggering.

9. The control device of claim 8, wherein the comparison module implements the second condition as a precondition that must be met prior to determining whether the first condition is met, such that failure by any transformed acceleration signal to meet the second condition results in no further processing of the transformed acceleration signal by the comparison module.

10. A method for triggering a passenger protection arrangement for a vehicle, the method comprising:

providing at least two acceleration signals from at least two acceleration sensors oriented in different spatial directions, wherein each of the at least two acceleration sensors is oriented at a non-zero angle relative to both a horizontal axis and a vertical axis of a two-dimensional coordinate system in which the vertical axis lies along a vehicle longitudinal direction and the horizontal axis lies along a vehicle transverse direction;

transforming the at least two acceleration signals to corresponding acceleration signals along the horizontal and vertical axes of the coordinate system;

generating a triggering signal as a function of a comparison of the at least two acceleration signals and the transformed acceleration signals;

triggering the passenger protection arrangement as a function of the triggering signal;

determining that a scaled version of any of the transformed acceleration signals is smaller than one of the at least two acceleration signals from which the transformed acceleration signal was derived; and conditioning the generating of the triggering signal on the determining.

11. The method of claim 10, wherein a crash type is determined as a function of the comparison, and wherein the triggering signal is generated as a function of the crash type.

12. The method of claim 10, further comprising:

comparing one of the transformed accelerations to a predetermined threshold value and generating a first output signal, wherein a signal derived from the one of the transformed acceleration signals is compared to one of the at least two acceleration signals and a second output signal is generated, wherein at least one flag is set as a function of a linking of the first and the second output signals, and wherein the triggering signal is generated as a function of the setting of the at least one flag.

* * * * *